Feb. 16, 1965   H. HOFFMANN   3,169,455
PISTON-AND-CYLINDER ARRANGEMENT
Filed Oct. 2, 1962   2 Sheets-Sheet 1

Helmut Hoffmann
INVENTOR.

BY *Mestern, Ross & Mestern*

AGENTS.

3,169,455
PISTON-AND-CYLINDER ARRANGEMENT
Helmut Hoffmann, Bad Homburg, Germany, assignor to Alfred Teves Maschinen- und Armaturenfabrik Kommandit-Gesellschaft, Frankfurt am Main, Germany, a corporation of Germany
Filed Oct. 2, 1962, Ser. No. 227,759
Claims priority, application Germany, Nov. 30, 1961, T 21,200
7 Claims. (Cl. 92—205)

My present invention relates to a piston-and-cylinder arrangement and, more particularly, to an arrangement for sealing pistons and/or piston rods of hydraulic and pneumatic cylinders operable with fluids under pressure.

Heretofore piston and piston rods of fluid-operated cylinders required frequent overhaul or replacement of their sealing means (e.g. piston rings) as a consequence of wear of the sealing element. Thus, when flange-space or lip-type sealing members were provided on reciprocating pistons, wear of the surface in contact with the cylinder often resulted, while solid sealing rings were frequently shifted within their annular recesses so as to permit transfer of pressure medium between the chambers defined on opposite sides of the piston. Moreover, flange-type sealing elements require a considerable and consistent pressure differential between these two chambers to urge the flanges against the piston and the cylinder.

It is an object of the present invention to provide a piston-and-cylinder arrangement wherein the above-mentioned disadvantages are obviated.

A more particular object is to provide improved sealing means for pistons and piston rods of fluid-operated cylinders having a long life and wear resistance, whereby the piston may have a minimum length and, consequently, a maximum stroke.

These objects are achieved, in accordance with the invention, by providing a bipartite piston assembly whose relatively axially movable pistons form between them a compartment of variable volume containing a compressible fluid. This compartment is sealed from communication with the cylinder chambers formed on opposite sides of the piston. The relatively movable parts of the piston also form an annular recess of variable volume opening radially outwardly in the direction of the cylinder wall and containing a substantially incompressible medium peripherally sealing the piston within the cylinder. The incompressible medium is, advantageously, a plastically deformable body provided with a sealing composition having lubricating as well as filling characteristics. Thus, any surface irregularities in the cylinder wall may be filled upon reciprocation of the piston while the sealing composition simultaneously prevents transfer of fluid from one cylinder chamber to the other.

Since the compartment of variable volume contains a compressible fluid (e.g. a gas such as air), an increase in pressure in one of the cylinder chambers will, via a differential piston effect, force the sealing composition against the wall of the cylinder without substantial limitation by the compressible fluid at a higher pressure than is prevalent in either chamber. Leakage of fluid past the sealing member is, therefore avoided. In effect, each of the pistons forming the assembly comprises a working surface of relatively large surface area exposed to fluid pressure within one of the cylinder chambers and a seal-compression surface of relatively small surface area, outwardly of the compartment, bearing upon the incompressible but deformable sealing means. The gas-filled compartment with its relatively small increase in pressure permits relative displacement of the two pistons to apply a pressure to the sealing means in excess of that prevalent in either of the chambers. The compressive force applied to the sealing means is thus equivalent to the sum of the pressures applied by each of the high-pressure surfaces of the pistons thereto.

In my copending application Ser. No. 222,583 filed September 10, 1962 and entitled Device for Smoothing a Rough Surface I disclose and claim a sealing and filling composition consisting of molybdenum disulfide and a synthetic resin binder therefor. The binder is, advantageously, a relatively soft polymeric material, such as polyethylene, the molybdenum disulfide constituting about 80% by weight of the deformable mass. The filling-agent mass may be provided in the form of a ring which is used in conjunction with a coating, support or sealing ring having high wear resistance. This adjoining ring, which uniformly deposits the molybdenum disulfide upon the cylinder wall, may be composed of limitedly cross-linked polyurethane resin and adapted to pick up the filling agent and sealingly to engage the surface coated therewith. A ring of polytetrafluoroethylene may be disposed axially on opposite sides of the filling agent in engagement with the cylinder wall to prevent the deformable mass from entering any clearance between the later and the piston. These aspects of the invention will be readily apparent from my copending application.

According to the more specific feature of the invention the sealing means further comprises a deformable element, e.g. of rubber, molybdenum disulfide-impregnated asbestos, synthetic resin or other material flowable under pressure and extending transversely to the axis of the piston for urging the deformable mass against the cylinder wall. This sealing element is, advantageously, dished and of truncated-conical configuration so that the effective stroke may be increased while the total length of the piston assembly is correspondingly reduced. The dished element advantageously diverges conically outwardly in the direction of the low-pressure member of the piston assembly and may be provided with an annular flange extending perpendicularly to the piston axis which bears upon the deformable filling-agent ring.

The piston-and-cylinder sealing arrangement described above is particularly suitable for hydropneumatic pressure accumulators wherein a compressible fluid such as air is pressurized with the aid of a liquid. In this case, a piston assembly is freely displaceable within the cylinder. It should be noted, however, that similar or identical arrangements can also be used for pistons displaceable on piston rods or like hydropneumatic systems.

The above and other objects, features and advantages of the present invention will become more readily apparent from the following description, reference being made to the accompanying drawing in which.

Figure 1:
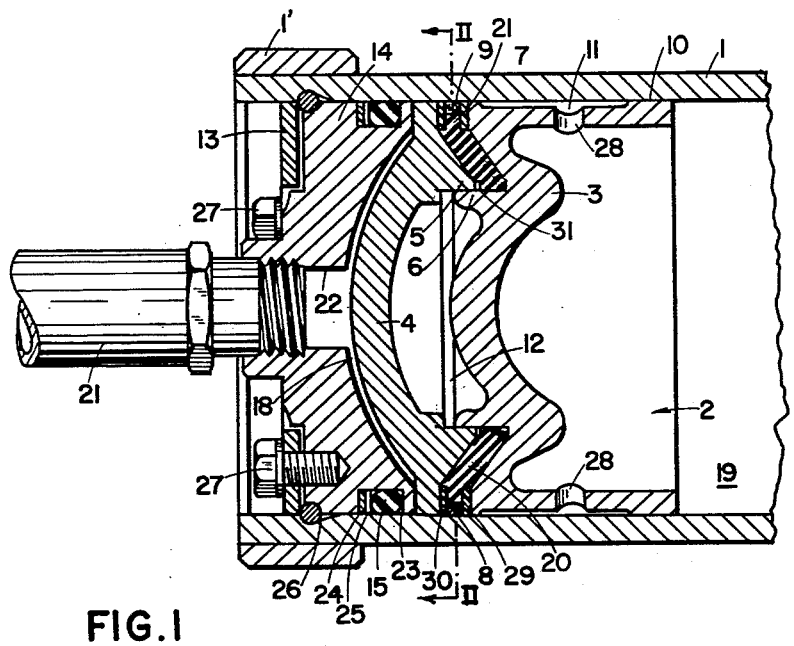
FIG. 1 is an axial cross-sectional view of the liquid-inlet end of a hydropneumatic accumulator according to the invention.
Figure 2:
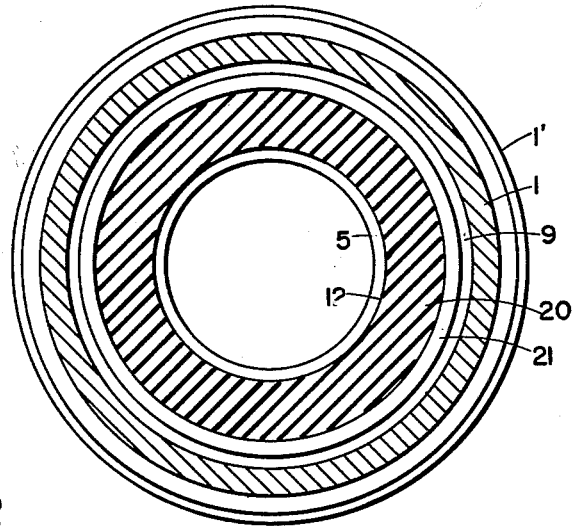
FIG. 2 is a cross-sectional view taken along the line II—II of FIG. 1.
Figure 4:
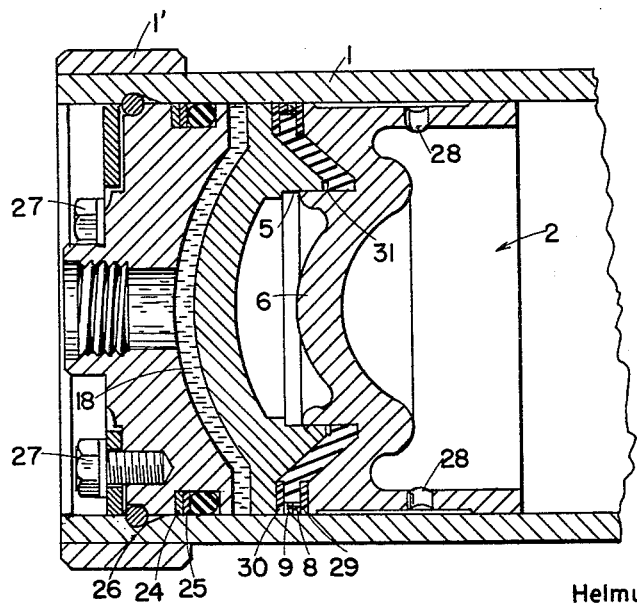
FIG. 4 is a view similar to FIG. 1 showing the piston assembly thereof in another operative position.

In FIGS. 1 and 4 I show a cylinder 1, which may be an extruded or drawn tube having a relatively rough cylinder wall with irregularities ranging between 3 and 10 microns, formed with a reinforcing ring 1' and receiving a piston assembly 2 axially reciprocable therein. The bipartite piston assembly 2 subdivides the cylinder 1 into a low-pressure chamber 18 into which a liquid can be forced under pressure via an inlet tube 21 threadedly received in an axial bore 22 of an end wall 14 of the cylinder, and a high-pressure chamber 19 for a compressible fluid (e.g. air).

Figure 3:
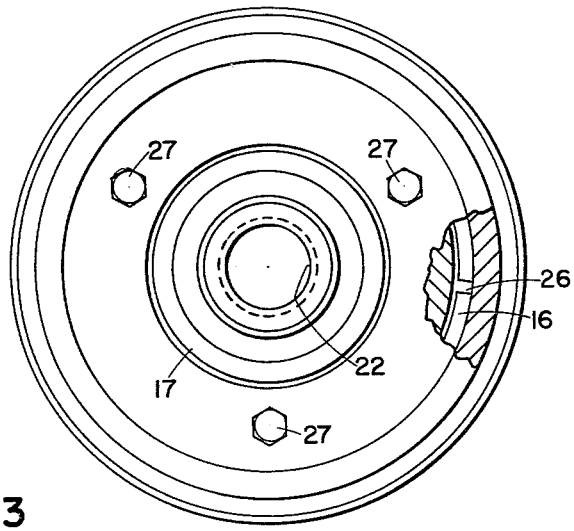
FIG. 3 is an end view of the accumulator.

The end wall 14 is provided with a circumferential recess 23 receiving an O-ring 15 and a pair of annular shims 24, 25 which fill the space remaining in recess 23. The O-ring 15 seals the left-hand extremity of the cylinder which is provided with a groove 26 adapted to receive a split ring 16 which limits axial displacement of the end wall 14 to the left (FIG. 1). An annular plate 13 engages this split ring and is drawn with end wall 14 thereagainst by a plurality of bolts 27 (FIG. 3).

The piston assembly 2 comprises a high-pressure piston 3 and a low-pressure piston 4 which are telescopable to form a compartment 12 sealed from communication with the chambers 18, 19 and filled with a compressible fluid, i.e. air. The high-pressure piston 3 of the assembly is provided with an axially extending guide surface 10 juxtaposed with the cylinder wall in engagement therewith and provided with a peripheral recess 11 to reduce friction between the piston assembly and this wall. Radial bores 28 in the piston 3 communicate between the high-pressure chamber 19 and the recess 11 so that any flow of deformable filling agent into this recess against the high pressure therein is prevented. Piston 2 is formed with an axially extending bore 5 which slidably receives an axially extending projection 6 of piston 3 to form the closed compartment 12. Outwardly of this projection 6, the two pistons define an annular recess 7 which conically diverges from the axis of the piston assembly in the direction of the low-pressure piston 4. A deformable (e.g. rubber) sealing element 20, 21 of disk-shaped configuration conforming to that of the recess, is disposed therein and bears outwardly against a plastically deformable molybdenum disulfide ring 8 and an adjoining ring 9 adapted to deposit the filling and lubricating agent upon the walls of the cylinder and to sealingly engage the latter. A pair of polytetrafluoroethylene rings 29, 30 surround the filling agent in engagement with the cylinder wall to prevent it from flowing into any annular clearance between the pistons 3, 4 and the cylinder wall. Another plastically deformable ring 31 is provided to coat and seal the mutually engaging surfaces of the recesses 5 and projection 6.

The dished sealing element is formed with a conical portion 20 having an outwardly extending annular flap 21 upon which the deformable ring 8 of filling agent is carried. When the liquid under pressure is introduced via tube 21 into chamber 18 the piston assembly 2 is shifted axially to the right (FIG. 4). Displacement of the piston assembly halts when the pressure in both chambers 18, 19 is substantially equal. Since the fluid within compartment 12 is a compressible gas and the sealing element is relatively incompressible although deformable, only a limited displacement of the two pistons toward each other occurs. This limited displacement suffices to increase greatly the pressure applied to the sealing element 20, 21 which then forces the sealing rings 8, 9 against the cylinder wall with comparably great force. Inasmuch as the fluid within compartment 12 does not limit substantially the mutual displacement of the pistons 3, 4, each of the latter is, in effect, a differential piston applying relatively large pressures to the sealing element. Filling agent is then deposited upon the cylinder wall which is thus smoothed while additional filling agent serves to lubricate the ring 9 seated against this wall. While a flat sealing ring may be employed, it would be necessary, in this case, to add a length equal to the height of the truncated-cone-shaped sealing element 20, 21 to the piston assembly if the air-tight character of chamber 12 is to be maintained. The filling agent protects the abrasion-sensitive element 20, 21 which, as previously mentioned, may be composed of rubber. The resulting assembly has a virtually unlimited life since frictional deterioration of the sealing element is sharply reduced while sealing pressure is maintained although some abrasive erosion of the sealing means may occur.

The invention as illustrated and described is believed to admit of many modifications and variations within the ability of persons skilled in the art and within the spirit and scope of the appended claims.

What I claim is:

1. In a piston-and-cylinder arrangement, in combination, a cylinder having an inner wall; a piston assembly axially reciprocable within said cylinder and comprising first and second relatively movable pistons jointly displaceable within said cylinder, said first and second pistons being provided with interfitting means forming between them a closed central compartment of variable volume containing a gas and respective juxtaposed high-pressure surfaces defining an annular recess of variable volume outwardly of said compartment confronting said wall of said cylinder, said recess extending generally transversely to the axis of said cylinder, each of said pistons having a respective low-pressure surface having a surface area in excess of that of the respective high-pressure surface exposed to fluid pressure in one of said chambers, said assembly subdividing said cylinder into a pair of working chambers isolated from said compartments; and a sealing element deformable under pressure in said recess and disposed between said high-pressure surface for compression thereby radially outwardly into engagement with said wall upon introduction of fluid under pressure into at least one of said chambers against one of said low-pressure surfaces to displace said assembly within said cylinder while concurrently exerting pressure upon one of said pistons in the direction of the other of said pistons, said interfitting means including a male formation on one of said pistons disposed on a high-pressure side of said cylinder and a female formation complementarily receiving said male formation formed in the other of said pistons, said male and female formations being axially aligned, said recess being of truncated conical configuration and diverging from said axis in the direction of said low-pressure side of said cylinder.

2. The combination as defined in claim 1 wherein said sealing element is formed with an outer ring of wear-resistant material in engagement with said wall.

3. The combination as defined in claim 2 wherein said material is a limitedly cross-linked polyurethane resin.

4. The combination as defined in claim 2 wherein said sealing element is further provided with an outer ring of deformable molybdenum disulfide adapted to smooth irregularities in said wall upon reciprocation of said assembly within said cylinders.

5. In a piston-and-cylinder arrangement, in combination, a cylinder having an inner wall; a piston assembly axially reciprocable within said cylinder and comprising first and second relatively movable pistons jointly displaceable within said cylinder, said first and second pistons being provided with interfitting means forming between them a closed central compartment of variable volume containing a gas and respective juxtaposed high-pressure surfaces defining an annular recess of variable volume outwardly of said compartment confronting said wall of said cylinder, said recess extending generally transversely to the axis of said cylinder, each of said pistons having a respective low-pressure surface having a surface area in excess of that of the respective high-pressure surface exposed to fluid pressure in one of said chambers, said assembly subdividing said cylinder into a pair of working chambers isolated from said compartment; and a sealing element deformable under pressure in said recess and disposed between said high-pressure surface for compression thereby radially outwardly into engagement with said wall upon introduction of fluid under pressure into at least one of said chambers against one of said low-pressure surfaces to displace said assembly within said cylinder while concurrently exerting pressure upon one of said pistons in the direction of the other of said pistons, said sealing element being formed with an outer ring of wear-resistant material in engagement with said wall, said sealing element being further provided with an outer ring of a deformable filling agent adapted to smooth irregularities in said wall upon reciprocation of said assembly within said cylinder.

6. The combination as defined in claim 5 wherein said filling agent is molybdenum disulfide.

7. The combination as defined in claim 5 whereby said material is a limitedly cross-linked polyurethane resin.

References Cited in the file of this patent
UNITED STATES PATENTS

| | | |
|---|---|---|
| 2,004,618 | Schmidt | June 11, 1935 |
| 2,157,039 | Van Hooydonk | May 2, 1939 |